United States Patent [19]
Long et al.

[11] Patent Number: 5,991,763
[45] Date of Patent: Nov. 23, 1999

[54] METHOD AND APPARATUS FOR EMBEDDING CONCATENATED DATA FILES INTO OBJECT FILES DURING RUNTIME IN A VIRTUAL FILE SYSTEM

[75] Inventors: Dean R. E. Long, Boulder Creek; Graham Hamilton, Palo Alto; Nedim Fresko, San Francisco, all of Calif.

[73] Assignee: Sun Microsystems, Inc., Palo Alto, Calif.

[21] Appl. No.: 08/955,432

[22] Filed: Oct. 21, 1997

Related U.S. Application Data

[60] Provisional application No. 60/033,748, Oct. 29, 1996.

[51] Int. Cl.$^6$ ..................................................... G06F 17/30
[52] U.S. Cl. .......................... 707/101; 707/100; 707/102; 707/103; 707/205
[58] Field of Search .................................. 707/1, 2, 3, 6, 707/103, 200, 201, 202, 203, 204, 205, 206, 100–104; 395/681, 702, 703, 712, 710, 685, 825, 828, 683, 708, 701–704

[56] References Cited

U.S. PATENT DOCUMENTS

| | | | |
|---|---|---|---|
| 5,163,131 | 11/1992 | Row et al. | 709/202 |
| 5,303,380 | 4/1994 | Tenny et al. | 395/710 |
| 5,361,349 | 11/1994 | Sugita et al. | 707/8 |
| 5,450,586 | 9/1995 | Kuzara et al. | 395/704 |
| 5,513,348 | 4/1996 | Ryu et al. | 707/1 |
| 5,561,799 | 10/1996 | Khalidi et al. | 707/200 |
| 5,594,903 | 1/1997 | Bunnell et al. | 395/712 |
| 5,634,124 | 5/1997 | Khoyi et al. | 707/103 |
| 5,649,200 | 7/1997 | Leblang et al. | 395/703 |
| 5,675,802 | 10/1997 | Allen et al. | 395/703 |
| 5,745,888 | 4/1998 | Bauer et al. | 707/1 |
| 5,778,226 | 7/1998 | Adams et al. | 395/681 |
| 5,778,384 | 7/1998 | Provino et al. | 707/200 |
| 5,819,276 | 10/1998 | Cai et al. | 707/100 |
| 5,845,295 | 12/1998 | Houseman et al. | 707/204 |

OTHER PUBLICATIONS

El Din Mahmoud, M.M et al., ADOS/Linux extensible file system, computers and communications, 1997 proceedings, second IEEE symposium, and 311–315, Jul. 1997.

*Primary Examiner*—Jack M. Choules
*Assistant Examiner*—Srirama Channavajjala
*Attorney, Agent, or Firm*—Beyer & Weaver, LLP

[57] ABSTRACT

Methods, systems, and software for efficiently creating virtual file systems including object files which contain data are described. In one aspect of the invention, a method for creating a virtual file system includes retrieving a data file from a file system. A snapshot of the data file is created and converted into an object data file. The converted object data file is linked to at least one other object file. The data file can be concatenated with at least one other data file to create the snapshot. A set of assembly instructions for creating an object file from the snapshot is generated. The assembly instructions include instructions to reserve space within the object file for data contained in the data file. The assembly instructions are converted into an object file and the snapshot of the data file is copied into the reserved space.

16 Claims, 7 Drawing Sheets

METHOD AND APPARATUS FOR EMBEDDING CONCATENATED DATA FILES INTO OBJECT FILES DURING RUNTIME IN A VIRTUAL FILE SYSTEM

This application claims priority under 35 U.S.C. 119(e) of Provisional U.S. Patent Application Serial No. 60/033,748, filed Oct. 29, 1996, which is incorporated herein by reference in its entirety.

BACKGROUND OF THE INVENTION

1. Field of Invention

The present invention relates generally to methods, apparatus, and software for managing and accessing computer files. More particularly, the present invention relates to software, methods, and apparatus for efficiently embedding data files and file names into object files to create a virtual file system for use by software running on a computer system.

2. Background

A networked computer system often includes file systems which are shared between different programs and even different operating systems. A kernel, which includes generally one or more programs that control basic system functions within an operating system, has to constantly access physical files, either remote or local, during the execution of the kernel or during the execution of an application program by the computer. Such requirements are both time consuming and utilize many computer system resources. By way of example, having to constantly access a file system which is located on a remote hard disk generally reduces the overall speed and efficiency at which the kernel can execute. This in turn can affect the performance of the entire computer system.

As a result, "virtual" file systems can be created in computer memory, i.e., either random access memory (RAM) or read-only memory (ROM). These virtual file systems can be loaded into computer memory simultaneously with a kernel or application program which is expected to use the file systems. Loading the virtual file systems at the same time as the kernel or programs are loaded is possible as virtual file systems comprise only that portion of the data contained in the file system that is relevant to the kernel or program. In other words, as the file systems which are used by a program are generally identifiable, it is possible to include virtual representations of the file systems with data which may be loaded with the program.

As file systems typically include data files, the creation of virtual file systems generally involves instantiating data files, as well as the names of data files, into object files which may be linked to obtain an image of executable code that is loaded into the computer memory as the virtual file system. As will be appreciated by those skilled in the art, an image of executable code is basically a computer program which includes computer instructions in a form which can be recognized and processed by a computer processor. Methods used to instantiate data files into object files typically either involve converting the data into source code for a higher level programming language, or converting the data directly into a higher-level language data structure, as for example an array created in the C language. In general, an object file may then be obtained by using either the source code version of the data contained in data files, or the higher-level language data structure.

Converting data files into source code or a higher-level language data structure is time consuming however. As data files generally must be converted each time a program associated with the data files is run in order to assure that the virtual data files used by the program will be current, the process of converting data can greatly reduce the speed at which a program may be built, i.e., converted, compiled, and linked, forcing the user to wait for access to operational software. What is desired, therefore, is an efficient method and apparatus for creating a virtual file system in computer memory.

SUMMARY OF THE INVENTION

In accordance with the present invention, the above-described difficulties in efficiently converting data files into source code or a higher-level language data structure are addressed by providing, in one aspect, a method, system, and software for creating object files from data files by taking snapshots of the data files. The software, methods, and apparatus described herein will be recognized as providing an efficient method for creating virtual file systems.

In one aspect, in accordance with the present invention, a method for creating a virtual file system in a computer memory includes, in one embodiment, retrieving a data file from a file system. A snapshot of the data file is created and converted into an object data file. In another embodiment, the converted object data file is linked to at least one other object file. In still another embodiment, the data file is concatenated with at least one other data file to create the snapshot. In yet another embodiment, a set of assembly instructions for creating an object file from the snapshot is generated. The assembly instructions include instructions to reserve space within the object file for data contained in the data file. The assembly instructions are converted into an object file and the snapshot of the data file is copied into the reserved space.

In another aspect, in accordance with the present invention, a computer-readable medium containing computer-readable program code devices is configured to cause a computer to create a virtual file system in a computer memory. In one embodiment, the computer-readable program code devices are configured to cause a computer to retrieve a data file from a file system. A snapshot of the data file is created and converted into an object data file. In another embodiment, the computer-readable program code devices are configured to link the object data file to at least one other object file. In still another embodiment, the data file is concatenated with at least one other data file to create the snapshot. In yet another embodiment, the computer-readable program code devices are configured to create a set of assembly instructions for an object file from the snapshot. The assembly instructions include instructions to reserve space within the object file for data contained in the data file. The assembly instructions are converted into an object file and the snapshot of the data file is copied into the reserved space.

In yet another aspect, in accordance with the present invention, a computer system that includes a computer memory in addition to a file system having at least one data file is provided. The computer system is configured to create a virtual file system in the computer memory and includes a retrieval mechanism for retrieving a data file from a file system. In addition, the computer system includes a data recovery mechanism for creating a snapshot of said data file. Finally, in another embodiment, a builder is provided for converting the snapshot into an object data file.

In one embodiment of the above-described computer system, a linker for linking the object data file to at least one other object file is also provided. In another embodiment, the computer system includes a concatenator for concatenating the retrieved data file to at least one other data file to create a snapshot of the data file. In still another embodiment, the computer system includes an assembler for generating a set of assembly instructions for creating an object file from the concatenated data files. The assembler further is capable of reserving space within the object file for data from the concatenated data files. A copier for copying the snapshot into the reserved space is also included.

These, and other aspects and advantages of the present invention, will become apparent when the Description below is read in conjunction with the accompanying Drawings.

DETAILED DESCRIPTION OF THE DRAWINGS

Certain embodiments of software, methods, and apparatus for creating virtual file systems will be described herein below, including embedding data files and file names into object files without converting the data into source code or higher-level language data structures, making reference to the accompanying drawings. Using the software, methods, and apparatus described herein, virtual file systems can be constructed more efficiently, thereby improving the performance of both operating system and application software.

Figure 1:
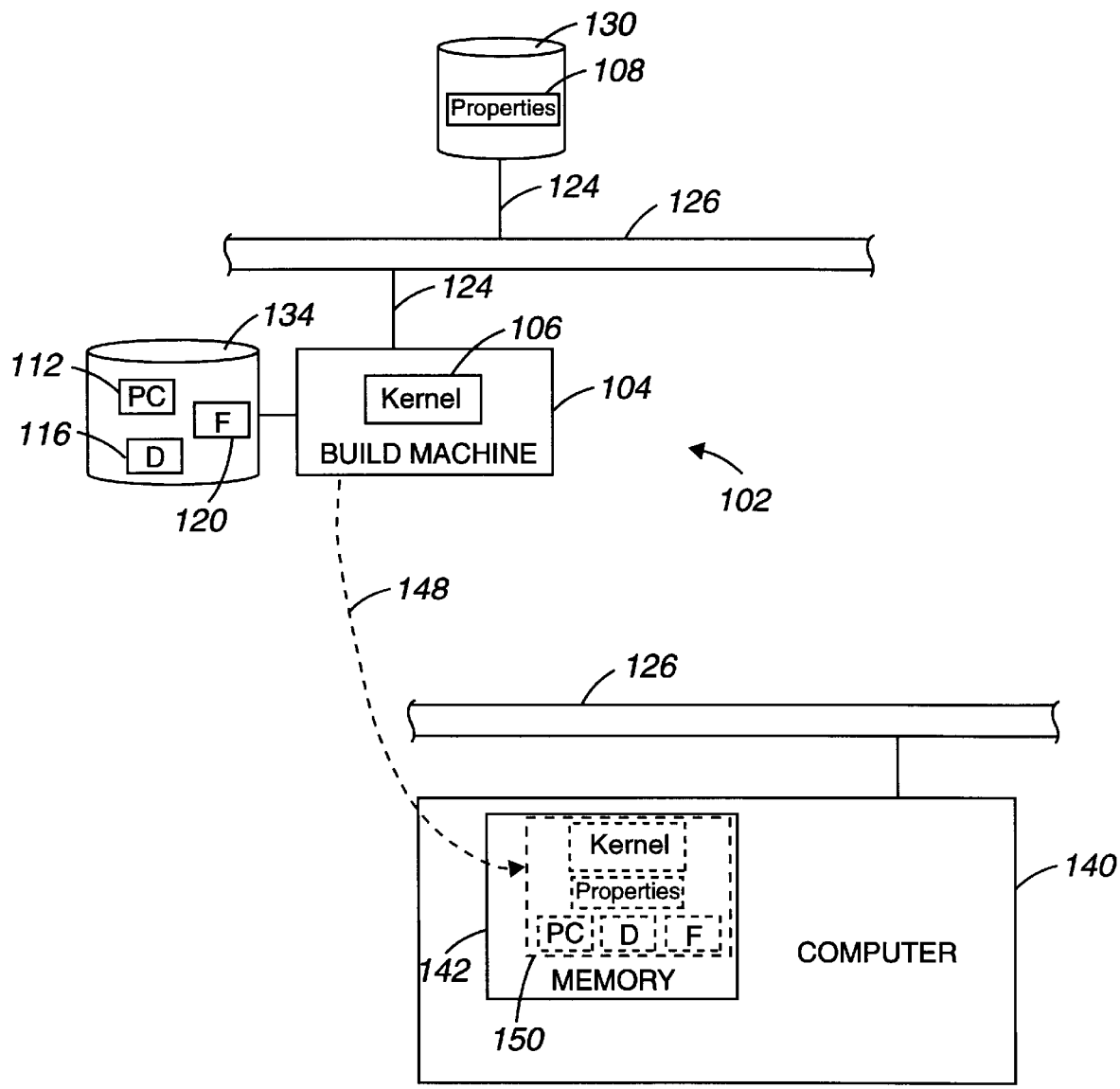
FIG. 1 is a diagrammatic representation of a computer system on which a kernel image can be created and a computer system on which the image can be executed in accordance with an embodiment of the present invention.

FIG. 1 is a diagrammatic representation of a computer system on which a kernel image may be created, and a computer system on which the image may execute in accordance with an embodiment of the present invention. A networked computer system 102 includes a build machine 104 on which a kernel or an application program 106, can be built. In order for kernel 106 to be built on build machine 104, kernel 106 generally must have access to various files which are necessary for execution of the kernel software (or program). While inclusion of virtual files in kernel 106 is described, inclusion of virtual files in any program is analogous to the inclusion of virtual files in kernel 106 as will be described below. By way of example, in the case for which a kernel is being launched, these files, which may include a file structure, can further include, but are not limited to, a properties file 108, program code (PC) 112, a data file (D) 116, and/or a font file (F) 120. These files may be accessible to build machine 104 through a network connection such as shown at 124. By way of example, properties file 108, which may be located on a data server 130, may be accessible to build machine 104 over network connection 124 across a network backbone 126. Alternatively, files, as for example program code 112, data file 116, and font file 120, can be located on a data server 134 that is directly linked to build machine 104.

Other computers may require access to the file structure associated with kernel 106 when an image of kernel 106 is loaded on those computers. These computers can access the requisite files of file structure directly. However, as directly accessing the file structure is generally inefficient, and, in some cases, impractical, creating a virtual file system in memory that is associated with the computers serves the purpose of allowing efficient access to the virtual file system.

A computer 140 on which an image of kernel or application program 106 is to be run can download an overall representation of kernel (or application) 106, and any file structure associated with kernel 106, into memory 142 associated with computer 140. That is, an image 150 of kernel 106 and the associated file structure may be downloaded into memory 142 for execution as indicated generally by arrow 148. In some embodiments, image 150 may be downloaded from build machine 104 over a network across a network backbone 126. In other embodiments, read-only memory (ROM) or a hard disk may be used to download image 150 into memory 142.

As discussed above, virtual file systems are generally created to eliminate the need to constantly access physical file systems during the course of executing a kernel or other computer program. In general, a virtual file system exists in computer memory, as for example random access memory (RAM) or read-only memory (ROM), and, hence, enables a program to access the virtual file system as if the virtual file system were a local file system. Object files which correspond to physical files may be created such that they may be linked together with other files which are relevant to the program in order to form an executable program, or program image. Files which are normally accessed during the execution of a computer program include data files. In order to create object files from data files, the data files are usually converted into source code for a higher programming language. Converting data files into source code generally also requires a conversion of the source code to assembly language in order for an object file to be obtained from the data file.

By embedding data files directly into object files, the resources and time required to convert data files can be reduced. According to one embodiment of the present invention, one approach to embedding data files directly into object files includes taking "snapshots" of data files at the time a program is being built, and enabling the snapshots, or concatenated versions of data files, to be readily accessible in memory to the program when the program executes. Therefore, a virtual file system which includes the data files is immediately available to an image of a program or a kernel.

Figure 2:
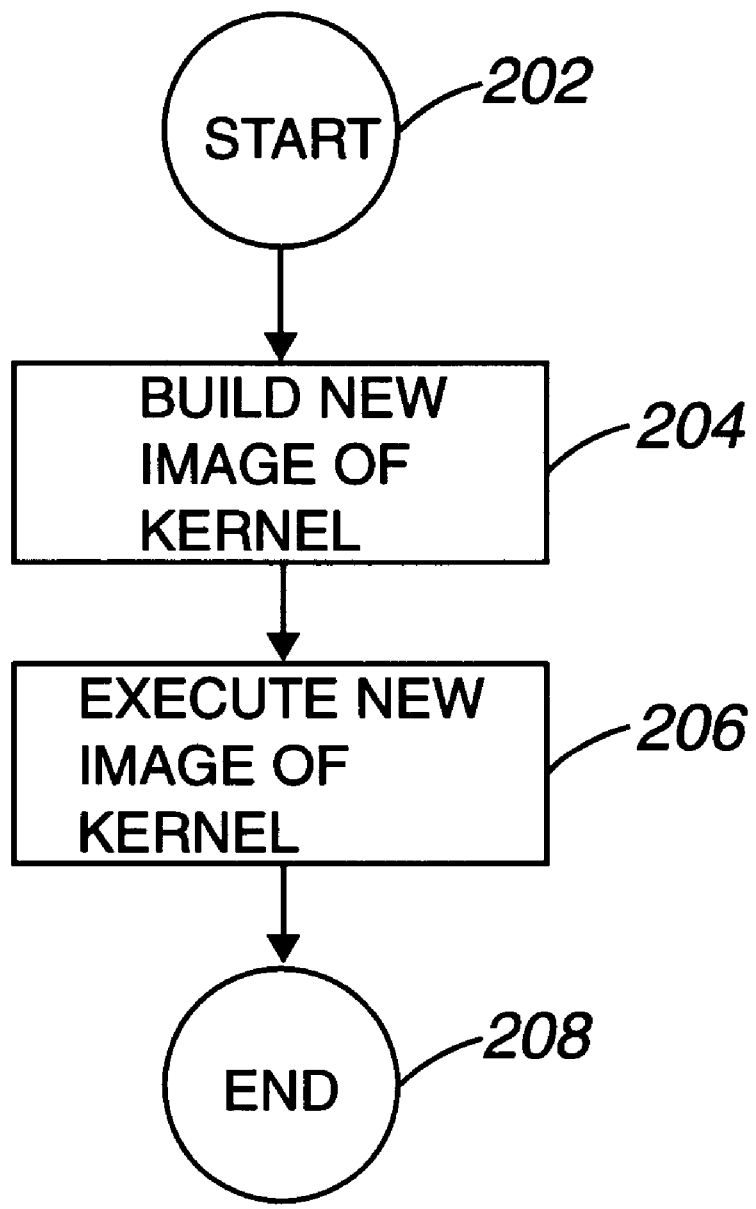
FIG. 2 is a process flow diagram which illustrates the steps associated with launching a new kernel on a computer system in accordance with an embodiment of the present invention.

FIG. 2 is a process flow diagram which illustrates a process of launching a new kernel on a computer system in accordance with an embodiment of the present invention. As a kernel comprises a set of programs which make up the core of an operating system, references herein to kernels may be considered to be references to programs in general.

Therefore, the terms "kernel" and "application program" or "program" will be used interchangeably. The process of installing a new kernel on a computer system begins at 202. In a step 204, a new image of a kernel is built. In general, the new image of the kernel is built on a build machine, which may be a computer that houses the kernel and has access to all files necessary to create the image of the kernel, as was previously described with reference to FIG. 1. The steps associated with building a new image of a kernel will be described in below with respect to FIG. 3. After the new image of a kernel is built, the new image of the kernel is executed in a step 206. For example, a "booter" (i.e., software effective to cause other software to launch and operate) on a computer system which will use the image of the kernel loads the new image of the kernel into memory where the image will execute. Once the new image of the kernel is executed, the process of launching the new image is completed at 208.

Figure 3:
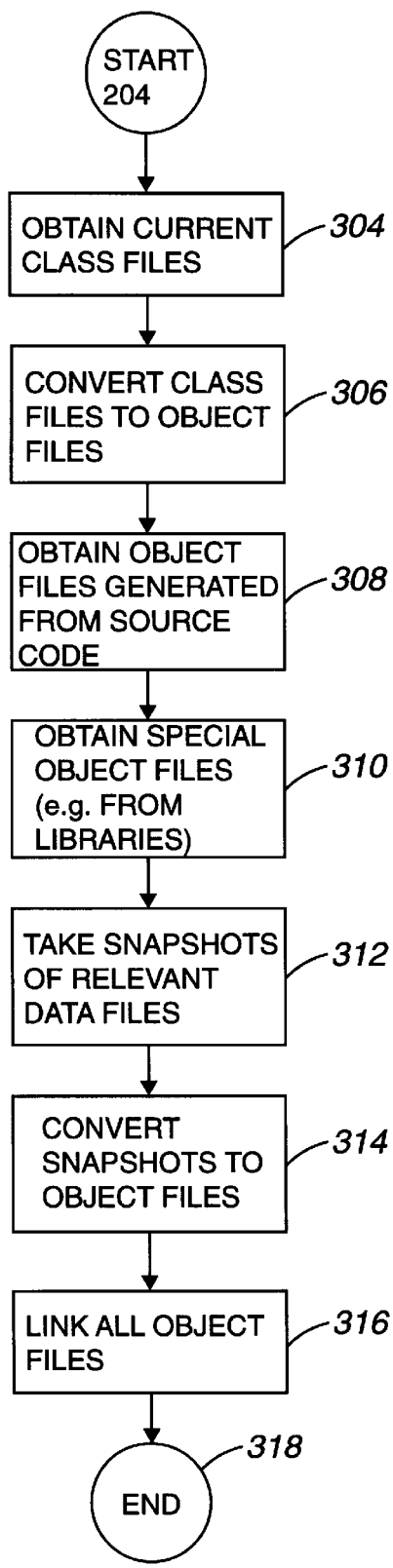
FIG. 3 is a process flow diagram which illustrates the steps associated with building a new image of a kernel in accordance with an embodiment of the present invention.

Referring next to FIG. 3, the steps associated with building a new image of a kernel will be described in accordance with one embodiment of the present invention. That is, step 204 of FIG. 2 will be described. In the illustrated embodiment, a set of relevant, current class files is obtained by the build machine in a step 304. A class file may be defined as a file which contains a software construct that defines the data, e.g., state, and methods, e.g., behavior, of objects that may be constructed using the class file. In one embodiment, class files are created by compiling source files written in the Java programming language available from Sun Microsystems of Mountain View, Calif. The current class files are generally the most recent versions of the class files which are available. In some embodiments, obtaining the class files may entail locating the class files on the build machine. In other embodiments, the class files may be obtained from a computer network or an external storage disk. However, it will be appreciated that files other than the above-described class files can be used in accordance with the methods, software, and apparatus of the present invention.

The class files obtained in step 304 are converted into object files in a step 306. As will be appreciated by those skilled in the art, any suitable method may be used to convert the class files into object files. After the class files are converted into object files, any object files generated from source code, e.g., C language code, or assembly language are obtained in a step 308. It should be appreciated that only the object files which are relevant to the kernel are obtained. In a step 310, "special" object files which are relevant to the kernel are obtained. Special object files are generally considered to be object files that do not need to be converted or generated from other files. Special object files can be obtained from libraries of object files which were previously created. By way of example, object files which are placed in libraries may be object files which correspond to class files and source code which rarely change. Creating an object file from a source code rile each time the source code file is needed by a kernel is inefficient, especially in the event that the source code file never changes. Therefore, a special object file for the source code file may be created such that a new object file does not have to be created each time the source code file is needed.

Snapshots of relevant data files are taken in a step 312. In other words, snapshots are taken of data files which are part of a file system to which the kernel requires access. The sub-steps associated with taking the snapshots of relevant data files will be described below with respect to FIG. 4. After the snapshots of the data files are taken in step 312, process flow proceeds to a step 314 in which the snapshots of the data files are converted into object files. One method which may be used to convert snapshots into object files will be describe below with reference to FIG. 5.

Once the snapshots are converted into object files, all object files associated with the kernel are linked together in a step 316. The purpose of linking the object files is to obtain an executable image of the kernel. Methods used to link object files to create an executable file are well known to those of ordinary skill in the art. In some embodiments, since the special object files which were previously obtained in step 310 do not need to be converted or otherwise generated, the special object files may be obtained as a part of the step of linking all relevant object files. In other words, the special object files may be obtained as a part of step 316. After the image is obtained, the process of building a new image of a kernel ends at 318.

It should be appreciated that the object files may be linked in many different ways. By way of example, several object files may be linked together to form one "large" object file. This large object file may then be linked with other object files to create an image. Further, in some embodiments, all relevant data files may not be initially identified in step 312. As such, steps 312 and 314 may be repeated until snapshots of all relevant data files are converted into object files. In addition, it will also be appreciated by those of skill in the art that the above-described sequence of operations can be re-ordered without departing from the present invention.

Figure 4:
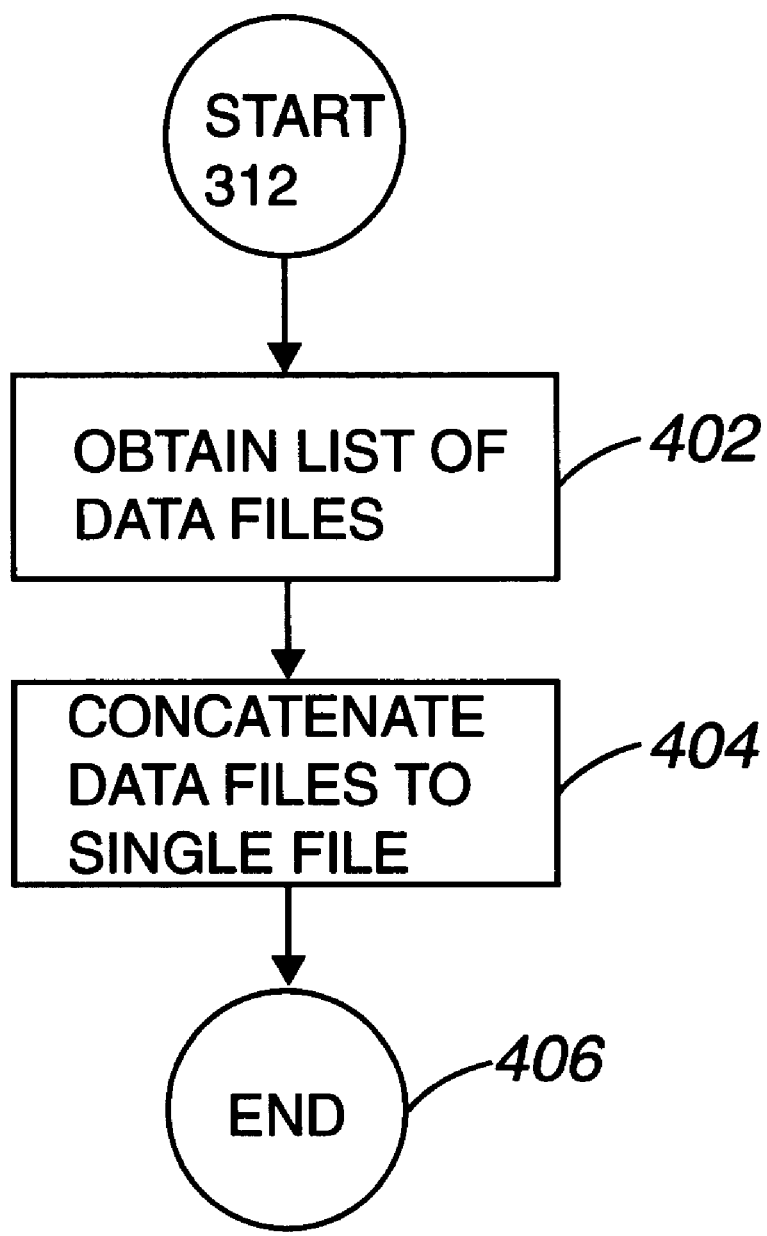
FIG. 4 is a process flow diagram which illustrates the steps associated with taking snapshots of data files in accordance with an embodiment of the present invention.

Referring next to FIG. 4, a process of taking snapshots of data files, i.e., step 312 of FIG. 3, will be described in accordance with an embodiment of the present invention. A list of data files, which are needed to build a new image, is obtained in a step 402. In one embodiment, the list of data files may be generated from known dependencies. In another embodiment, the list of data files may be manually entered into a computer system. After the list of data files is obtained, the data files in the list are concatenated together to form a single data file in a step 404. Methods used to concatenate files are well-known to those of ordinary skill in the art. While a single large file is typically created by concatenating data files in step 404, it should be appreciated that rather than creating a single large file, several smaller files may be created instead.

In the described embodiment, the single file of concatenated data files includes all of the data contained in the individual data files. The concatenation of the data files does not involve a conversion of the data contained in the data files. The single large file formed by concatenating data files is considered to be a snapshot of the data files. After the data files are concatenated, the process of taking snapshots of data files ends at 406.

Figure 5:
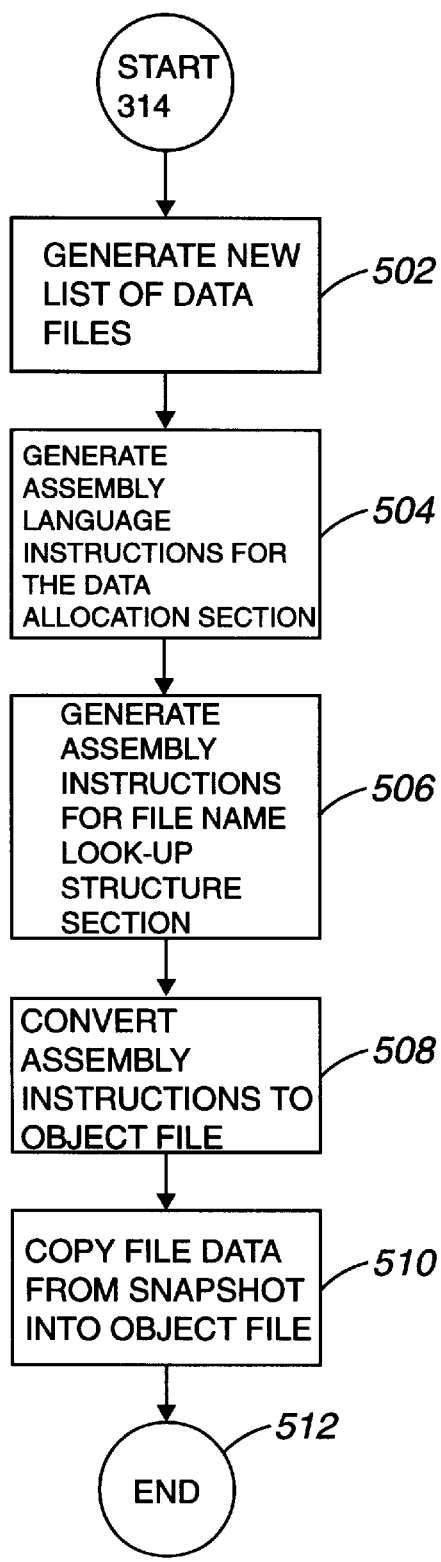
FIG. 5 is a process flow diagram which illustrates the steps associated with converting snapshots into object files in accordance with an embodiment of the present invention.

FIG. 5 is a process flow diagram which illustrates the steps associated with converting snapshots of data files into object files in accordance with an embodiment of the present invention. In other words, FIG. 5 illustrates step 314 of FIG. 3. In a step 502, a new list of data files is generated. The list of data files used in step 402 of FIG. 4 is processed to create a new list of data files which includes new file names that are appropriate for a virtual file structure. That is, file names which a run-time kernel can use to locate the files within the virtual file structure is created. By way of example, strings which comprise the names of data files typically include a directory path. Since the virtual file structure may require a different directory path, in one embodiment, the names of data files may be modified to remove the old directory paths from the names and add new directory paths, thereby essentially creating new names for the data files.

In a step 504, assembly language instructions for a data allocation file are generated. The data allocation section is generally a section which contains sizing information which relates to an object file which is to be created to hold a data snapshot. An object file formed to hold data in accordance with the present invention will initially be formed with a "hole," or reserved space, included within the object file. This hole is intended for the inclusion of the data snapshot, or snapshots, obtained as described above with respect to FIG. 4. As such, the hole must be properly sized to include the snapshot. Hence, the data allocation file typically includes information which relates to the size of the hole, in addition to information regarding identification symbols which are used in a file name look-up structure file.

Assembly language instructions for a file name look-up structure file are generated in a step 506. A file name look-up structure is used to associate a new file name, i.e., a file name from the list created in step 502, with data. In general, the look-up structure is used to associate file names with appropriate data while a kernel is running. One look-up structure file will be described below with reference to FIG. 6.

In a step 508, the assembly language instructions from the data allocation file and the look-up structure file are used to create an object file. In other words, the assembly language instructions generated in steps 504 and 506 are converted into an object file, or files, in step 508. Assembly language instructions may be converted into object files using any suitable assembler. It should be appreciated that step 508 is substantially the same as step 308 of FIG. 3. However, while object files may be generated from either source code or assembly language instructions in step 308, object files are only generated from assembly language instructions in step 508. Each object file created in step 508 includes a hole of a size sufficient to accommodate data contained within a snapshot as specified in the data allocation file. In general, an object file is arranged such that the portions of the object file that correspond to the assembly language instructions for the look-up structure are placed in a specific section such that all look-up structures associated with object files may readily be located at link time. As such, the look-up structures may be built by the linker when the object files are linked together, i.e., the look-up structures may be created in step 316 of FIG. 3.

After the object file is created, the file data contained in a snapshot of data files is copied into the object file in a step 510. That is, the data from the snapshot is embedded in the object file. Specifically, the data contained within the snapshot is copied into the hole which was included in the object file at the time the object file was created in step 508. Once the data contained within the snapshot is copied into the object file, the process of converting snapshots to data files is completed at 512.

Figure 6:
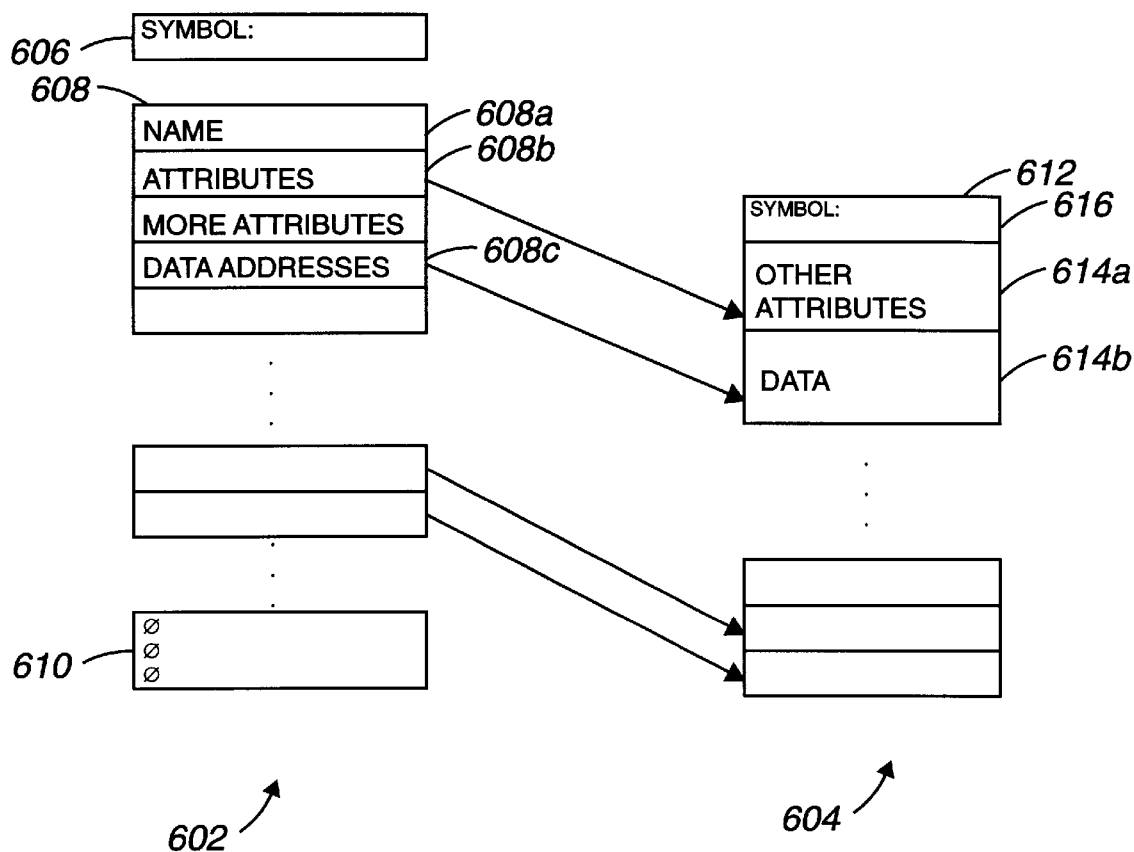
FIG. 6 is a diagrammatic representation of a mapping between a look-up table and file data in accordance with an embodiment of the present invention.

Referring next to FIG. 6, a mapping between a file name look-up structure, as mentioned above with respect to FIG. 5, and file data will be described in accordance with an embodiment of the present invention. A look-up table section 602 generally includes symbolic links to a file data section 604. Look-up table section 602 includes a first entry 606 which is meant to indicate the beginning of look-up table section 602. Intermediate entries, as for example intermediate entry 608, in look-up table section 602 hold data file names which are appropriate for a virtual file structure, i.e., entry 608 holds a new file name generated in step 502 of FIG. 5. Entry 608 can also hold various other information in addition to a file name 608*a*. This other data can include, but is not limited to, attributes 608*b* and data addresses 608*c*. Thus other data can further include references to other sections, or files, which contain information that is relevant to the file which corresponds to file name 608*a*. The last entry 610 generally included in look-up table section 602 is arranged to identify the end of the look-up table section. In the embodiment as shown, last entry 610 is a null entry, as last entry 610 comprises null values.

Intermediate entry 608 holds a file name 608*a* which corresponds to a data file entry in file data section 604. A data file entry, as for example data file entry 612, generally holds information which corresponds to the data file which is either embedded, or is to be embedded, in an object file. The information in a data file entry 612 can include attributes 614*a* pertaining to the size of a data file, as well as symbolic references which can be resolved to actual memory address locations which correspond to the address of the data file. Data file entry 612 also generally includes data 614*b*. The symbolic references are typically provided by the data allocation file for which assembly language instruction were generated in step 504 of FIG. 5. As shown, intermediate entry 608 is associated with data file entry 614. Specifically, attributes 608*b* are associated with attributes 614 of data file entry 612, and data addresses 608*c* are associated with data 614*b*, as shown. Therefore, the information in data file entry 612 corresponds to the data file name in intermediate entry 608. The first entry 616 in data file section 604 is a symbol which identifies the beginning of the data file section 604.

As will be appreciated by those skilled in the art, as shown, the symbol in first entry 616 of data file entry 612 is associated with attributes 614*a* and data 614*b*. The association of a single symbol with attributes 614*a* and data 614*b* is possible due to the fact that data file entry 612 is contiguous. However, if attributes 614*a* and data 614*b* are located in different sections, then attributes 614*a* and data 614*b* can be associated with separate, distinct symbols.

Figure 7:
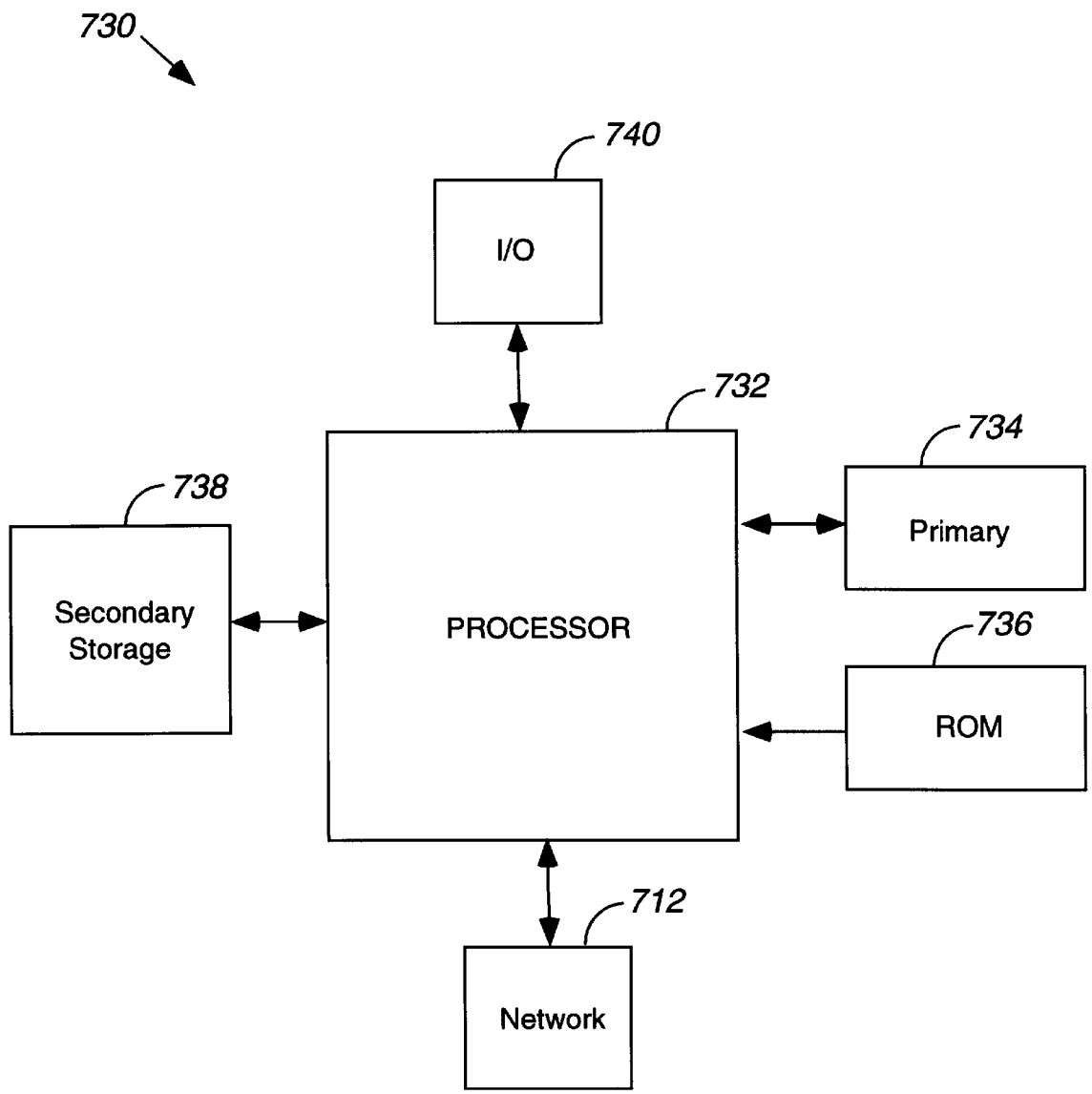
FIG. 7 is a diagrammatic representation of a typical computer system in accordance with an embodiment of the present invention.

FIG. 7 illustrates a typical computer system in accordance with the present invention. The computer system 730 includes any number of processors 732 (also referred to as central processing units, or CPUs) that is coupled to memory devices including primary storage devices 734 (typically a read only memory, or ROM) and primary storage devices 736 (typically a random access memory, or RAM). As is well known in the art, ROM 734 acts to transfer data and instructions uni-directionally to the CPU and RAM 736 is used typically to transfer data and instructions in a bi-directional manner. Both primary storage devices 734, 736 may include any suitable computer-readable media as described above. A mass memory device 738 is also coupled bi-directionally to CPU 732 and provides additional data storage capacity. The mass memory device 738 may be used to store programs, data and the like and is typically a secondary storage medium such as a hard disk that is slower than primary storage devices 734, 736. Mass memory storage device 738 may take the form of a magnetic or paper tape reader or some other well-known device. It will be appreciated that the information retained within the mass memory device 738, may, in appropriate cases, be incorporated in standard fashion as part of RAM 736 as virtual memory. A specific mass storage device such as a CD-ROM 734 may also pass data uni-directionally to the CPU.

CPU 732 is also coupled to one or more input/output devices 740 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 732 optionally may be coupled to a computer or telecommunications network, e.g., an Internet network or an intranet network, using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the steps associated with building an image of a kernel may be widely varied. Steps may also be removed or added without departing from the spirit or the scope of the present invention. Further, the process of obtaining and linking object files may vary based upon the requirements of a particular computer system. Therefore, the described embodiments should be taken as illustrative and not restrictive, and the invention should be defined by the following claims and their full scope of equivalents.

We claim:

1. A method for creating a virtual file system in a computer memory, the method comprising:

retrieving a data file from a file system;

creating a snapshot of said data file, the snapshot being a substantially concatenated version of the data file; and converting said snapshot of said data file into an object data file.

2. The method of claim 1, further including linking said object data file to at least one other object file.

3. The method of claim 1, wherein said snapshot is created by concatenating said retrieved data file to at least one other data file.

4. The method of claim 3, further comprising:

generating a set of assembly instructions for creating an object file from said snapshot, said set of assembly instructions including instructions to reserve space within said object file for data in said data file;

converting said set of assembly instructions into said object file, said object file including reserved space; and copying said snapshot into said reserved space.

5. The method of claim 1 wherein the data file is a first data file, the method further including:

retrieving a second data file from the file system, wherein creating the snapshot includes concatenating the first data file to the second data file.

6. The method of claim 5 wherein the snapshot is a first snapshot and the object data file is a first object data file, the method further including:

retrieving a third data file from the file system;

creating a second snapshot of the third data file; and converting the second snapshot of the third data file into a second object data file.

7. The method of claim 6 further including linking the second object data file to the first object data file.

8. The method of claim 1 wherein converting said snapshot of said data file into an object data file includes:

generating a list, the list including a new name for the data file;

generating at least one assembly language instruction for a data allocation file, the data allocation file being associated with the data file, wherein the data allocating file is arranged to include information pertaining to the size of the object data file;

converting the assembly language instruction for the data allocation file into the object data file; and embedding the snapshot into the object data file.

9. A computer-readable medium for creating a virtual file system in a computer memory, said computer-readable medium comprising computer-readable program code devices configured to cause a computer to:

retrieve a data file from a file system;

create a snapshot of said data file, wherein the snapshot of the data file is a substantially concatenated version of the data file; and convert said snapshot of said data file to an object data file.

10. The computer-readable medium of claim 9, further including computer-readable program code devices configured to cause a computer to link said object data file to at least one other object file.

11. The computer-readable medium of claim 9, further including computer-readable program code devices configured to cause a computer to create said snapshot of said data file by concatenating said retrieved data file to at least on other data file.

12. A computer-readable medium of claim 11 further including computer-readable program code devices configured to cause a computer to:

generate a set of assembly instructions for creating an object file from said snapshot, said set of assembly instructions including instructions to reserve space within said object file;

convert said set of assembly instructions into said object file, said object file including reserved space; and copy said snapshot into said reserved space.

13. A computer system including a computer memory, said computer system including a file system having at least one data file and said computer system being configured to create a virtual file system in said computer memory, said computer system comprising:

a retrieval mechanism for retrieving a data file from a file system;

a data recovery mechanism for creating a snapshot of said data file; and a builder for converting said snapshot of said data file to an object data file.

14. The computer system of claim 13, further a linker for linking said object data file to at least one other object file.

15. The computer system of claim 14, further including a concatenator for concatenating said retrieved data file to at least one other data file to create said snapshot of said data file.

16. The computer system of claim 15, further comprising:

an assembler for generating a set of assembly instructions for creating an object file from said concatenated data files, said set of assembly instructions including instructions to reserve space within said object file; and a copier for copying said snapshot into said reserved space.

* * * * *